United States Patent [19]

Razzano

[11] Patent Number: 5,457,220
[45] Date of Patent: Oct. 10, 1995

[54] PROCESS FOR THE PRODUCTION OF CROSSLINKED SILOXANES BY DISPROPORTIONATION

[75] Inventor: John S. Razzano, Cohoes, N.Y.

[73] Assignee: General Electric Company, Waterford, N.Y.

[21] Appl. No.: 235,431

[22] Filed: Apr. 29, 1994

[51] Int. Cl.[6] .................................................. C07F 7/08
[52] U.S. Cl. ...................... 556/453; 556/450; 556/455; 556/456; 556/462; 528/14; 528/19; 528/21; 523/212; 523/216; 524/508; 428/391
[58] Field of Search .................................. 556/450, 453, 556/455, 456, 462; 528/14, 19, 21; 523/212, 216; 524/588; 428/391

[56] References Cited

U.S. PATENT DOCUMENTS

| | | |
|---|---|---|
| 3,706,775 | 12/1972 | Nitzsche et al. . |
| 4,203,903 | 5/1980 | Evans . |
| 4,902,813 | 2/1990 | Wegehaupt et al . |
| 5,210,129 | 5/1993 | Habimana et al. .................... 528/19 X |
| 5,210,131 | 5/1993 | Gilson et al. . |
| 5,380,902 | 1/1995 | Hager et al. ......................... 556/450 X |

*Primary Examiner*—Paul F. Shaver

[57] ABSTRACT

The present invention relates to a new silicone cure system. More particularly, the present invention discloses that a siloxane system containing sufficiently high levels of T or Q species in addition to M, D and a limited amount of silanol species can be cured by linear phosphonitrilic chloride disproportionation catalyst.

37 Claims, No Drawings

PROCESS FOR THE PRODUCTION OF CROSSLINKED SILOXANES BY DISPROPORTIONATION

The present invention relates to a novel process to disproportionation of organosilicon compounds. More particularly, it is concerned with the use of linear phosphonitrilic chloride disproportionation catalyst to crosslink a siloxane system containing sufficiently high levels of crosslinking species in addition to linear species.

BACKGROUND OF THE INVENTION

Organosiloxane polymers are prepared on an industrial scale using two basic processes. The most widely practiced process is known as the equilibration process which involves the catalytic rearrangement of siloxane bonds to form an equilibrated mixture. The term equilibration is used to describe the phenomenon which exists when the ratio of linear organosiloxane polymers to cyclic organosiloxane oligomers is maintained at a constant value. When dimethylsiloxane is polymerized, equilibrium is reached when the ratio of linear polymer to cyclic oligomers is about 86:14 on a weight-weight basis. A constant ratio of linear to cyclic organosiloxanes is always reached even when the starting material is a cyclic organosiloxane, a mixture of cyclic material and linear material or an all linear monomer or oligomer.

Equilibration is reached by the use of a wide variety of acidic or basic materials as catalysts. During the equilibration process, a constant breaking and forming of siloxane bonds takes place until the equilibrium point is reached. The massive breaking and forming of siloxane bonds permits the use of chainstoppers which will react to form a terminal non-chain extending group on the end of the polysiloxane molecule. The cyclic oligomers are removed from the reaction mixture at the end of the equilibration process by a stripping process after deactivation or removal of the catalyst. The formation of cyclics is a substantial drawback because it adds to the cost of the process and extends the time necessary to complete the processes.

An alternative process for producing organosiloxane polymers is condensation which promotes the head to tail condensation of silanol terminated siloxane monomers or oligomers. The condensation processes depend on the removal of water to form higher molecular weight polymers. Cyclics are not produced in the condensation process. Useful condensation catalysts include phosphorus nitrogen compounds (PNC). Relatively mild acids and bases have also been used as condensation catalysts. Strong acids and bases have been used as condensation catalysts at temperatures that will not result in equilibration and the formation of cyclic organosiloxanes. The general procedure which is used in the condensation process is to combine one disilanol monomer or oligomer with an acidic, basic or PNC catalyst and, after the desired polymer has reached the desired molecular weight, the polymerization is terminated. The reaction may be terminated by deactivating the catalyst using a suitable alkaline or acidic material. The neutralization will prevent further polymerization and will permit the use of the polymer without further purification. In the case of PNC catalysts, deactivation occurs when the product is heated above 160° C.

In a copending application Ser. No. 08/092,450 filed Jul. 15, 1993, Applicants described a novel process which is characterized as a disproportionation reaction. Applicants discovered that if two or more M and D containing polymers, which have different molecular weights, are combined at weight ratios of from about 1:99 to 99:1 or more preferably from 5:95 to 95:5 in the presence of a condensation/disproportionation catalyst, such as a linear phosphonitrilic chloride, an extremely fast and complete siloxane disproportionation reaction takes place between M and D containing polymers. The reaction results in the formation of a lower molecular weight product than one of the two starting materials without the formation of substantial amount of cyclics.

The linear organopolysiloxanes prepared by the above systems can be crosslinked in various ways to produce cured silicone materials. Some of the previously known methods, however, require expensive platinum, vinyl and hydride groups, or toxic materials such as tin compounds which are harmful to the environment. Other known silicone curing systems rely on the use of organoperoxides. Such peroxides decompose during cure to produce undesirable byproducts. These byproducts must be removed from the rubber product, and generally enter the atmosphere in a process known as post baking.

SUMMARY OF THE INVENTION

The present invention designs a siloxane disproportionation reaction to create a cross-linking system. The process produces organopolysiloxane compounds by disproportionation in a single step process. The process does not form any significant quantity of by-product. More specifically, the present invention produces highly branched and cured organopolysiloxanes by mixing siloxanes comprising triorganosiloxane units, diorganosiloxane units with a sufficient amount of siloxanes comprising monoorganosiloxane units, $SiO_{4/2}$ units, or mixtures thereof, and mixing a disproportionation/condensation catalyst to the siloxane mixture.

DETAILED DESCRIPTION OF THE INVENTION

The present provides an efficient method to produce highly branched and cured organopolysiloxanes. The starting materials employed in the invention is a siloxane mixture containing triorganosiloxanes (hereinafter "M units"), diorganosiloxanes (hereinafter "D units"); and a sufficient amount of organosiloxanes (hereinafter "T units") and/or $SiO_{4/2}$ (hereinafter "Q units"). The M and D units provide a linear system. The T and Q units provide a crosslinking system. A filler, such as siloxane, chlorosilane treated fumed silica, can be added in the siloxane mixture.

The M units and D units can be any of the existing silicone products, from silicone fluids to gums. The crosslinking species can be a MQ resin blended into the M/D siloxanes or the very inexpensive M, T, D hydrolyzate. Further, high silanol resins containing more than 90% T and no M can be used in limited amounts. The amount of the T units and/or Q units used in the invention is an effective amount to readily disproportionate the siloxane system. For example, when the siloxane mixture contains only M, D and T units, the amount of the T units has to be greater than ⅓ of the amount of the M units in order to get a lightly crosslinked polymer characterized as a gel. When the siloxane mixture contains M, D and Q units, the amount of the Q units has to be greater than ¼ of the amount of the M units in order to get a gel. The higher the amount of the T and/or Q units is in the system, the higher the crosslink density is.

The disproportionation cure can be a two part system: The first part contains the siloxanes with the required amounts of M, D, and T and/or Q units. The second part contains the active catalyst in an appropriate carrier which could be a solvent or selected siloxanes. When the two parts are mixed, the mixture cures at room temperature. The cure can be dramatically accelerated by heat up to 150° C.

In the practice of the process of the present invention it is important that the silanol content of the blended organosiloxanes be low since the presence of high levels of silanol (or water formed from the silanols) will dramatically reduce the rate of disproportionation of the blends of organosiloxanes. The silanol can prevent the blend from reaching the ultimate theoretical viscosity/crosslinking potential of the product blend. The general upper limit for silanol content is about 5,000, preferably 1,000, most preferably 750 ppm based on the total weight of the organosiloxanes in the blend.

The process of the invention can be carried out without the addition of any solvent provided that the reactants are miscible with the catalyst. The length of time required for the disproportionation reaction will vary from a few minutes to up to a few hours depending on the nature of the materials and the amount of the catalyst which is employed.

Among the most preferred catalysts for use in the practice of the invention are included phosphorus-nitrogen compounds which have been utilized in the prior art as condensation catalysts for making high molecular disilanols. Some of these catalysts are described in U.S. Pat. No. 5,210,131; U.S. Pat. No. 4,902,813; U.S. Pat. No. 4,203,903 and U.S. Pat. No. 3,706,775, all of which are incorporated by reference. Illustrative, but not limitative of such useful phosphorus-nitrogen catalysts include $Cl_3PN(PNCl_2)_xPCl_3 \cdot PCl_6$ (x=1) (LPNC) and short-chain linear phosphazenes of Formulae (Ia) or (Ib):

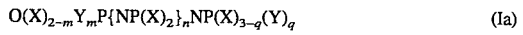

$$O(X)_{2-m}Y_mP\{NP(X)_2\}_nNP(X)_{3-q}(Y)_q \quad \text{(Ia)}$$

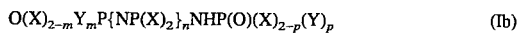

$$O(X)_{2-m}Y_mP\{NP(X)_2\}_nNHP(O)(X)_{2-p}(Y)_p \quad \text{(Ib)}$$

where n=0 or an integer from 1 to 8; m=0 or an integer of 1; p=0 or an integer of 1; q=0 or an integer of from 1 to 2; X=halogen; Y=OH, OR, O(O)CR, wherein R is alkyl or aryl, as catalysts for polycondensation and redistribution of organopolysiloxanes.

Also contemplated are reaction products of the linear PNC compounds with compounds containing active protons with pKa values below 18, such as carboxylic acids, halogenoalkane carboxylic acids, sulfonic acids, alcohols, phenols. Cyclic PNC compounds, such as $(PNCl_2)_x$, also operate but are very slow compared to linear catalysts. $Cl_3PN(PNCL_2)_xPCl_3 \cdot PCl_6$ (x=1) is the most preferred catalyst. The catalyst may have the general formula $[X(PX_2=N)_nPX_3]^+[MX_{(v-t+1)}R^2_t]^{31}$ wherein X denotes a halide ion, M is an element having an electronegativity on Pauling's scale of from 1.0 to 2.0, $R^2$ is an alkyl group having up to 12 carbon atoms, n is an integer with a value of from 1 to 8, v is the valence or oxidation state of M, and 0<t<v.

The amount of the catalyst that is employed is an effective amount to readily disproportionate the siloxane system. The amount to be employed is not critical and may vary from 5 to 500 parts per million and more preferably from 10 to 100 parts per million of total weight of the organosiloxane starting materials used in the practice of the invention. Higher amounts of catalyst will be used with higher silanol contents in the starting materials, e.g., 1000 to 5000 ppm of silanol. The catalyst is preferably dispersed or dissolved in an inert medium at a concentration of from 0.1 to 10 weight percent and preferably 0.5 to 5 weight percent in order to facilitate the handling of the catalyst and to facilitate dispersing the catalyst in the reaction mixture. Suitable solvents for the catalyst include esters, such as aliphatic ethers, aromatics, such as toluene, benzene, liquid siloxanes, chlorinated aliphatic and aromatic organic solvents such as methylene chloride, trichloroethane, 1,3,5-trichlorobenzene and the like.

After the disproportionation reaction has proceeded to the point where the desired product has been formed, the reaction may be terminated by raising the temperature to from 140° to 250° C. or more preferably to a temperature of from 180° to 200° C. In the alternative, the catalyst may be inactivated by neutralization with an alkaline material. Suitable alkaline materials include ammonia; hexamethyldisilazane, aliphatic primary, secondary and tertiary organic amines such as ethyl amine, diethyl amine, triethyl amine, propyl amine and the like. The amount of the neutralizing agent which is used should be sufficient to terminate the further disproportionation of the organosiloxanes in the reaction mixture and provide a stable product. This amount may be determined by reference to the total acid content and will generally be from 10 to 100 ppm of neutralizing agent based on the total weight of the reactants. Chemical and thermal deactivation are preferred but not required.

It was discussed in copending application Ser. No. 08/092/450 that a disproportionation of a mixture of siloxanes containing M and D groups using LPNC catalysts will produce a single polymers at the equilibrium viscosity without substantial cyclics formation when the silanol content is less than about 1000 ppm, LPNC catalysts are well known to be excellent condensation catalysts. If such mixture contains higher silanol content, the equilibrium viscosity will not be obtained. It is believed that higher silanol content, that is, above about 1000 ppm, hydrolyzes the LPNC, and the hydrolyzed catalyst is not a good disproportionation catalyst. However, such hydrolyzed catalyst is still an excellent condensation catalyst, and the LPNC catalyst is very effective in condensing disilanol oils, containing 20000 ppm silanol or more, to very high molecular weight. In the instant invention, it is desirable to effect a curing process by the rearrangement of siloxane mixtures containing M, D, T and/or Q units. It must be appreciated that if siloxane mixtures are composed of linear disilanol oils and T and/or Q species which are also high in silanol content, for example, 2000 to 40000 ppm silanol, and may or may not contain M groups, a curing process can occur by condensation alone or a combination of condensation and rearrangement. While such curing systems are operable, it will be very difficult to maintain a consistent level of crosslinking, since the deactivation of the disproportionation ability of the LPNC will prevent the T or Q species from being fully incorporated.

The above process is a cure system. This cure process has several advantages over any existing cure process. For example, the process permits a fully crosslinked system based on only methyl siloxanes. This has tremendous cost advantages over the "addition cure" system which requires 10–60 ppm platinum, and expensive vinyl and hydride functional silicones. The disproportionation cure of the present invention has low byproducts of cure if the system is very low in silanol, and produces only small amounts of water as by-product at the operable silanol content. The cured silicones produced by this simple, low cost, fast, low byproduct cure system has many uses, such as bumper gels, a whole range of paper release products and other coatings such as bottle coatings, and with reinforcing fillers, will produce a range of elastomeric products.

DESCRIPTION OF THE PREFERRED EMBODIMENTS

The following examples are included to illustrate the invention. All viscosities were measured at 25° C. Unless otherwise indicated, all parts are by weight.

EXAMPLE 1

Preparation Silicone Oil

An organosiloxane blend was prepared by combining 5 m% trimethylchlorosilane, 25m% methyltrichlorosilane, and 70 m% dimethyldichlorosilane. The blend was hydrolyzed to produce a silicone product containing an organic silicone oil and 21% HCl. The organic layer was decanted from the acid solution. The silicone oil was washed with sodium bicarbonate solution until it contained less than 3 ppm of HCl. This neutralized silicone oil contained about 40% volatile silicones, primarily silicone cyclics. 1000 grams of this silicone oil was stripped of volatile materials at 135° C. at 10 torr and yielded 620 grams of stripped oil containing 0.2% silanol. 300 grams of this stripped oil was added to a flask along with 5 grams of hexamethyldisilaxane (hereinafter "HMDZ"). The mixture was heated to 100° C. for 1 hour. Nitrogen gas was purged through the reaction mixture to remove most of the excess HMDZ, and the silicone oil was then stripped at 100° C. and 10 mm.

EXAMPLE 2

Preparation of Linear Phosphonitrilic Chlorides

Procedure A: Preparation of $Cl_3PN(PNCl_2)_xPCl_3 \cdot PCl_6$ (x=1)

A mixture containing 417 g (2 mols) of phosphorus pentachloride and 53.3 g (1 mol) of ammonium chloride in 1000 ml of tetrachloroethane is heated under reflux at the boiling point for 12 hours. Gas HCl is generated and removed. The volatile constituents are removed from the resultant pale yellow solution at 160° C. while reducing the pressure to about 1.33 hPa (absolute). Yellowish crystals which consist essentially of a compound of the formula $Cl_3PNPCl_2NPCl_3 \cdot PCl_6$ are recovered as the residue.

Procedure B: Preparation of $OCl_2PNPCl_2NPCl_3$

A 100 ml flask was charged with 20.8g (0.1 mol) of phosphorus pentachloride, 29.3 g of ammonium sulfate and 50ml of syntetrachloroethane. The mixture was stirred and refluxed over 1 hour. After the reaction was over, the solution was removed and the product was purified by vacuum distillation (b.p. 110°–115° C./0.1 mm Hg). The yield is 12g of $OCl2PNPCl_3$.

A 100 ml flask was charged with 13.5 g (0.05 mol) of $OCl_2PNPCl_3$ compound prepared above, 11.6 ml (0.055 mol) of $HN(Si(CH_3)_3)_2$ and 20 mol of methylene chloride. The mixture was stirred and refluxed over 12 hours. After the reaction was over, 10.3 g (0.05 mol) of $PCl_5$ was added, and the reaction mixture was refluxed for an additional 12 hours. The solvent was removed by rotavaporation and the product was purified by vacuum distillation (b.p. 170°–175° C./0.1 mm Hg). The yield of the title product as light yellow liquid was 8 g.

Procedure C: $[PCl_3=N\text{-}PCl_2=N\text{-}PCl_3]^+[SbCl_6]^-$ and $[PCl_3=N\text{-}(PCl_2=N)_2\text{—}PCl_3]^+[SbCl_6]^-$ 0.12 mole of $PCl_5$, 0.08 mole of $NH_4Cl$ and 0.04 mole of $SbCl_5$ were allowed to react together in 60ml of symtetrachloroethane at its refluxing temperature of 147° C. for 3.5 hours. After the reaction solution was filtered to remove insoluble compounds followed by removal of the solvent under reduced pressure. A bright yellow liquid was obtained which slowly crystallised upon cooling. The resulting catalyst was analysed by NMR (nuclear magnetic resonance) spectroscopy. It was found to be a 50/50 mixture of $[PCl_3=N\text{—}PCl_2=N\text{—}PCl_3]^+[SbCl_6]^-$ and $[PCl_3=N\text{—}(PCl_2=N)_2PCl_3]^+[SbCl_6]$ while no $[PCl_6]$ anion was observed.

EXAMPLE 3

Curing the Siloxane Mixture of Example 1

A trimethylsilyl terminated polydimethylsiloxane (hereinafter "PDMS") of selected viscosity was blended with the stripped, HMDZ treated silicone oil prepared in Example 1 to prepare solutions containing 20%, 20% and 30% of the stripped HMDZ treated oil. Each of these blends were added to a wide mouth jar and PNC catalyst of the type $Cl_3PN(PNCl_2)_xPCl_3 \cdot PCl_6$ (x=1) was added to the oil blend.

TABLE A

| Sample # | Grams of Oil made in Example 1 | Grams and types of PDMS | ppm LPNC (as 3% solution in $CH_2Cl_2$) |
|---|---|---|---|
| 1 | 16.8 | 67.4 of 350 cps | 100 |
| 2 | 16.8 | 67.4 of 30000 cps | 100 |
| 3 | 25.2 | 59 of 350 cps | 100 |

Each sample was prepared by mixing the two silicone oils and adding the methylene chloride solution of the catalyst and mixing thoroughly. The samples were deaired to remove air bubbles, and the samples were placed in a 135° C. oven for 90 minutes, cooled, and were fully cured to gel materials. The penetration of the gels were measured on a Texture Technologies Corp. penetrometer. The results are shown in Table B.

TABLE B

| Sample # | Penetrometer Penetration Force (gms) | Penetration Rate (mm/sec) | Penetration value (mm) |
|---|---|---|---|
| 1 | 100 | 0.5 | 0.8 |
| 2 | 100 | 0.5 | 0.6 |
| 3 | 100 | 0.5 | 0.3 |

The test results clearly indicate that phosphonitrilic chloride is a very effective catalyst to cause siloxane system contains sufficiently high levels of T units to crosslink. The higher the T level in the mixture is, the harder the gel is.

EXAMPLE 4

Curing a Mixture Containing M, D and C) Units

A mixture containing 75% of a 80000 cps dimethylvinyl terminated polydimethylsiloxane and 25% of a MD'Q resin was prepared. The D' units was 3.2% of methylvinylsiloxy and the M to Q ratio was 0.67. To this mixture was added 100 ppm of LPNC catalyst made in Precedure A of Examples 2 as a 3% solution in methylene chloride. The new mixture was vigorously agitated to mix in the catalyst, and was then deaired to remove bubbles. The sample was placed in a 135° C. oven for 90 minutes. The physical properties of the resulting cured product were measured. The penetration force was at 19.5 grams. The penetrometer rate was at 0.5 mm/sec. Penetration value was 2.3 mm. This result clearly indicates that a well cured gel was formed using the Q unit in an MD'Q resin as the crosslinking agent.

EXAMPLE 5

100 grams of fumed silica with a BET surface area of 200 m$^2$/g and 20 grams of octamethylcyclotetrasiloxane were placed in a one liter resin flask. The filler was stirred until fluidization was maintained and the flask contents were heated to 275° C. for 2 hours. A nitrogen purge was passed through the flask to remove unreacted siloxanes. The filler so treated, Filler A, had a silicone content of 8% by weight.

100 grams of a triorganoterminated PDMS of 20 million cps viscosity was placed on a two roll rubber mill and 10 grams of silicone oil prepared in Example 1 was thoroughly mixed in 25 grams of Filler A was milled into the polymer/oil blend and was masticated on the mill for 4 minutes. 200 ppm of LPNC made in Procedure A of Example 2 (as a 3% solution in methylene chloride) was added to the mixture on the mill and was mixed in for 1 minute. This uncured rubber compound was pressed into a rubber sheet in a 6 inches by 6 inches by 75 mil mold, and the mold was placed into a 135° C. over for 1 hour. A cured sheet of rubber was removed from the mold and the physical properties were measured. Shore A hardness was 27. Tensile strength was 176psi. Elongation% was 110. Bashore Resilience was 61.

The above-mentioned patents, publications and Test Methods are incorporated herein by reference.

Although specific examples of the invention have been described herein, it is not intended to limit the invention solely thereto but to include all variations and modifications falling within the spirit and scope of the appended claims.

What is claimed is:

1. A process for producing a highly branched and cured organopolysiloxane ag disproportionation, comprising the steps of
   (a) mixing siloxanes comprising triorganosiloxane units, diorganosiloxane units with siloxanes comprising monoorganosiloxane units and/or SiO$_{4/2}$ units; and
   (b) adding with agitation a phosphonitrilic disproportionation/condensation catalyst to the mixture of said step (a).

2. The process of claim 1, wherein the ratio between the triorganosiloxane units and the monoorganosiloxane units in the siloxane mixture of said step (a) is less than 3.

3. The process of claim 1, wherein the ratio between the triorganosiloxane units and the SiO$_{4/2}$ units in the siloxane mixture of said step (a) is less than 4.

4. The process of claim 1, wherein the disproportionation/condensation catalyst comprises phosphonitrilic chloride.

5. The process of claim 1, wherein the disproportionation/condensation catalyst comprises oxygenated phosphonitrilic chloride.

6. The process of claim 1, wherein the disproportionation/condensation catalyst comprises phosphonitrile halide catalyst having the general formula $[X(PX_2=N)_nPX_3]^+[MX_{(v-t+1)}R^2{}_t]^-$ wherein X denotes a halide atom, M is an element having an electronegativity on Pauling's scale of from 1.0 to 2.0, R$^2$ is an alkyl group having up to 12 carbon atoms, n is an integer with a value of from 1 to 8, v is the valence or oxidation state of M and 0<t<v.

7. The process of claim 1, wherein the silanol content of said siloxane mixture is less than 3000.

8. The process of claim 7, wherein the silanol content of said siloxane mixture is less than 1000.

9. The process of claim 1, wherein the siloxane mixture further comprises a filler.

10. The process of claim 9, wherein the filler is a treated fumed silica.

11. The process of claim 1, further comprising the step of heating the siloxane mixture.

12. The method of claim 11, wherein said step (b) is carried out in a temperature between 50°–150° C.

13. The method of claim 12, wherein said step (b) is carried out in a temperature between 80°–120° C.

14. A process for preparing a cross-linked and cured organopolysiloxane, comprising the step of
   (a) mixing siloxanes comprising diorganosiloxane units with siloxanes comprising monoorganosiloxane units, or mixtures thereof, wherein the silanol content of the mixture is between 100 and 3000; and
   (b) adding with agitation a disproportionation/condensation catalyst to the mixture of said step (a).

15. The process of claim 14, wherein the disproportionation/condensation catalyst comprises phosphonitrilic chloride.

16. The process of claim 14, wherein the disproportionation/condensation catalyst comprises oxygenated phosphonitrilic chloride.

17. The process of claim 14, wherein the disproportionation/condensation catalyst comprises phosphonitrile halide catalyst having the general formula $[X(PX_2=N)_nPX_3]^+[MX_{(v-t+1)}R^2{}_t]$ wherein X denotes a halide atom, M is an element having an electronegativity on Pauling's scale of from 1.0 to 2.0, R$^2$ is an alkyl group having up to 12 carbon atoms, n is an integer with a value of from 1 to 8, v is the valence or oxidation state of M and 0<t<v.

18. The process of claim 14, wherein the siloxane mixture further comprises a filler.

19. The process of claim 18, wherein the filler is a treated fumed silica.

20. The method of claim 14, further comprising the step of heating the siloxane mixture.

21. The method of claim 20, wherein said step (b) is carried out in a temperature between 50°–150° C.

22. The method of claim 21, wherein said step (b) is carried out in a temperature between 80°–120° C.

23. An article of manufacture, wherein the organopolysiloxanes of claim 1 is applied to a substrate and cured thereon.

24. A two part silicone cure system, comprising
   (a) a siloxane mixture comprising
      (i) siloxanes comprising triorganosiloxane units, diorganosiloxane units; and
      (ii) a sufficient amount of siloxanes comprising monoorganosiloxane units, SiO$_{4/2}$ units, and mixtures thereof; and
   (b) a disproportionation/condensation catalyst.

25. The silicone cure system of claim 24, wherein the ratio between the triorganosiloxane units and the monoorganosiloxane units in the siloxane mixture is less than 3.

26. The silicone cure system of claim 24, wherein the ratio between the triorganosiloxane units and the SiO$_{4/2}$ units in the siloxane mixture is less than 4.

27. The silicone cure system of claim 24, wherein the disproportionation/condensation catalyst comprises phosphonitrilic chloride.

28. The process of claim 24, wherein the disproportionation/condensation catalyst comprises oxygenated phosphonitrilic chloride.

29. The process of claim 24, wherein the disproportionation/condensation catalyst comprises phosphonitrile halide catalyst having the general formula $[X(PX_2=N)_nPX_3]^+[MX_{(v-t+1)}R^2{}_t]^-$ wherein X denotes a halide atom, M is an element having an electronegativity on Pauling's scale of from 1.0 to 2.0, R$^2$ is an alkyl group having up to 12 carbon atoms, n is an integer with a value of from 1 to 8, v is the valence or oxidation state of M and 0<t<v.

30. The silicone cure system of claim 24, wherein the silanol content of said siloxane mixture is less than 3000.

31. The silicone cure system of claim 30, wherein the silanol content of said siloxane mixture is less than 1000.

32. The silicone cure system of claim 24, wherein the siloxane mixture further comprises a filler.

33. The process of claim 32, wherein the filler is a treated fumed silica.

34. A process for making cross-linked and cured organopolysiloxane, comprising the steps of
(a) mixing 1.0–5.0% silanol-containing, soluble silicone monoorganosiloxane resin with linear disiloxanol polymer;
(b) adding a condensation/disproportionation/condensation catalyst.

35. The process of claim 34, wherein the disproportionation/condensation catalyst comprises phosphonitrilic chloride.

36. The process of claim 34, wherein the disproportionation/condensation catalyst comprises oxygenated phosphonitrilic chloride.

37. The process of claim 34, wherein the disproportionation catalyst comprises phosphonitrile halide catalyst having the general formula $[X(PX_2=N)_nPX_3]^+[MX_{(v-t+1)}R^2_t]^-$ wherein X denotes a halide atom, M is an element having an electronegativity on Pauling's scale of from 1.0 to 2.0, $R^2$ is an alkyl group having up to 12 carbon atoms, n is an integer with a value of from 1 to 8, v is the valence or oxidation state of M and $0<t<v$.

* * * * *